Patented May 19, 1931

1,805,889

UNITED STATES PATENT OFFICE

WALTER SCHOELLER AND HERBERT SCHOTTE, OF BERLIN, GERMANY, ASSIGNORS TO THE FIRM SHERING-KAHLBAUM AKTIENGESELLSCHAFT, OF BERLIN, GERMANY

SUBSTITUTED GUANIDINE ALCOHOLS

No Drawing. Application filed June 21, 1926, Serial No. 117,569, and in Germany January 7, 1925.

Our invention refers to new chemical compounds, viz. substituted guanidines, and to the method of producing same. This method consists in causing S-alkyl isothiourea or its derivatives to act on a solid or liquid amine or its derivatives having a basic reaction and which are liquid or solid at ordinary temperature, with or without the use of solvents. The reaction results in the splitting off of a mercaptan and the production of the corresponding guanidine compound. The corresponding amine need not be used in great excess, 1 to 1⅕ molecules of amine at the utmost sufficing for quantitative reaction.

The new compounds have the general formula

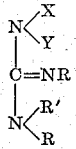

wherein R is a hydrogen atom, univalent hydrocarbon radical or an acyl group and the two R's may be the same or different, while X is a hydroxylated or alkoxylated alkyl group and Y a hydrogen atom or an alkyl group or X and Y form together a carbocyclic system, these products being bases capable of forming salts with acids and being decomposed by concentrated alkali.

The novel compounds are designed for therapeutical uses. They are decomposed by alkaline compounds and can be combined with phosphor-tungstic acid into complex compounds.

Example 1

185 grams (1 mol.) of S-ethyl isothiourea hydrobromide are mixed in finely powdered condition with 52.5 grams (less than 1 mol.) of ethanol amine, about 40 ccms of water being added if desired. The mixture is slightly heated and the urea derivative is dissolved. The solution soon becomes cloudy owing to the separating out of the liberated mercaptan, which is distilled off near the end in vacuo. The residue sometimes solidifies into a deliquescent radiated crystallizing mass which readily dissolves in water and alcohol. The picrate remains oily and dissolves with relative facility in water. The reaction occurs according to the formula

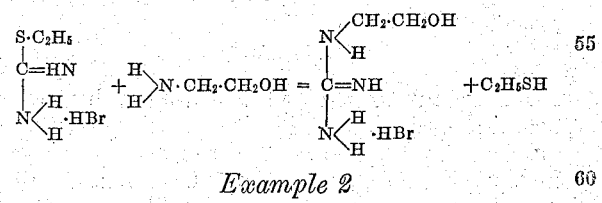

Example 2

185 grams S-ethyl isothiourea hydrobromide are dissolved in 40 ccms of water and 105 grams of O-acetyl amino ethanol are added. The mixture is allowed to stand some time and soon the reaction sets in, which results in about the equivalent quantity of mercaptan being liberated which is removed by distillation together with the solvent. The remainder forms an oil which up till now could not be obtained in crystalline form. It has the formula

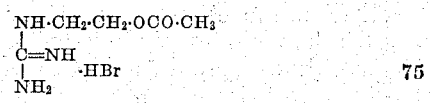

On the addition of sodium picrate an oily precipitate is formed in the concentrated solution of this compound, this precipitate being rather readily soluble in alcohol and water.

Example 3

185 grams of S-ethyl isothiourea hydrobromide and 77.5 grams of methyl amino ethanol are mixed, if desired in the presence of water. If this mixture is treated as usual the hydrobromide will crystallize out directly. It is also possible to precipitate the picrate of methyl guanidine ethanol which melts at 162–164° and dissolves with difficulty in cold water, but very easily in hot water. By decomposing the picrate with hydrochloric acid and extracting the picric acid with ether there is obtained the solution of the hydrochloride which on concentration solidifies to form a deliquescent radiated mass which readily dissolves in methyl, ethyl or isopropyl alcohol, with difficulty in amyl alcohol and is almost insoluble in acetic ester and acetone.

In consequence of its formation this compound has an asymmetric structure. It represents the alcohol of creatin, which hitherto could not be obtained, of the formula

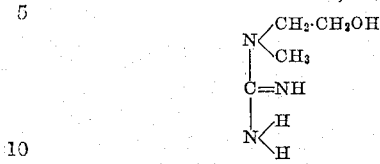

Instead of 185 grams of S-ethyl isothiourea hydrobromide 214 grams of S-methyl isothiourea hydroiodide can be caused to act on 77.5 grams methyl amino ethanol. The compound thus obtained is identical with the one above described. The picrate melts at 166°, the hydrochloride at 78°, the hydrobromide at 103°, the picrolonate is decomposed at 236–237°.

*Example 4*

185 grams of S-ethyl isothiourea hydrobromide are dissolved in a small quantity of water and are caused to react under formation of mercaptan with 120 grams of O-acetyl methyl amino ethanol. The product of reaction having the formula

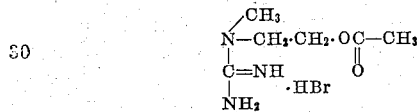

as well as its picrate were obtained in the form of an oil.

*Example 5*

A mixture of equimolecular quantities of ethyl amino ethanol and S-methyl isothiourea hydroiodide will react to form ethyl guanidine ethanol having the formula

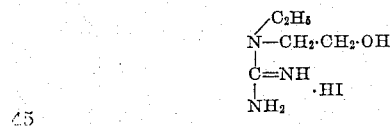

The picrate melts at 158°. The hydrochloride forms hydroscopic crystals.

*Example 6*

In the same manner as described with reference to Example 5 there is obtained the iso amyl homologue

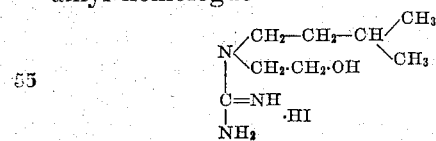

the picrate of which melts at 117–118°, while the hydrochloride forms a radiated crystalline mass.

*Example 7*

20 grams of N-methyl-S-ethyl isothiourea hydrobromide, if mixed with 8 grams of methyl amino ethanol react to form N-methyl-N'-methyl hydroxy ethyl guanidine

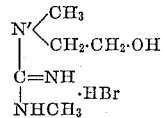

The picrate and the picrolonate of this compound dissolve in water only with difficulty, while the hydrochloride, bromide, and iodide dissolve readily.

*Example 8*

15 grams of amino acetal, if mixed with a solution of 18 grams of S-ethyl isothiourea hydrobromide in 4 ccms of water, react after a few minutes. The mixture is allowed to stand over-night, when the mercaptan and the water are removed by distillation. There remains the guanidine acetyl hydrobromide, which melts at 53–54° and is hydroscopic, while the hydroiodide which is obtained from S-methyl isothiourea hydroiodide, melts at about 60° and the picrate at 201°. The product of reaction proper has the formula

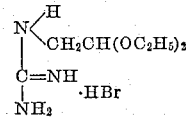

*Example 9*

3 parts of methyl amino acetal and 3.7 parts of S-ethyl isothiourea hydrobromide react quantitatively under the formation of N-methyl-N-(β-dioxethyl)ethyl guanidine hydrobromide.

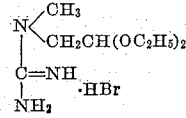

The picrate is soluble only with difficulty and melts at 116°.

*Example 10*

19 grams of S-ethyl-N-methyl isothiourea hydrobromide are moistened with a little water and on addition of 13 grams of amino acetal result in a colorless syrup, from which can be precipitated the picrate of N-methyl-N'-(β-dioxethyl)ethyl guanidine

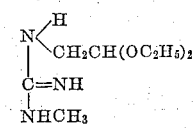

melting at 107° and dissolving in water only with difficulty.

*Example 11*

10 grams of aniline are added to a solution of 18 grams of S-methyl isothiourea hydrobromide in 4 ccms of water. The mixture results at once in a solution which is allowed to stand overnight at about 40° or is heated during 5 hours to 80°–100°. During the heating large quantities of mercaptan are developed. The last traces of mercaptan and unchanged aniline are extracted with ether. The residue is phenyl guanidine

having the form of a slightly yellow-colored syrup. Its picrate dissolves only with difficulty and melts at 223°, the hydrobromide melts at 71°.

Example 12

By reacting with 10 grams of α-amino pyridine on 18 grams of S-ethyl isothiourea hydrobromide there is obtained alpha-guanyl-2-pyridine hydrobromide

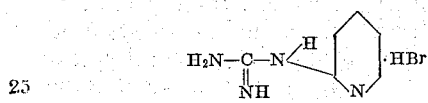

being a thick, somewhat brownish syrup which readily dissolves in solvents containing the hydroxyl group.

Example 13

10 grams of piperidine react under vigorous evolution of heat with 1/10 mole S-ethyl isothiourea hydrochloride. The resulting alpha-guanyl-1-piperidine hydrochloride

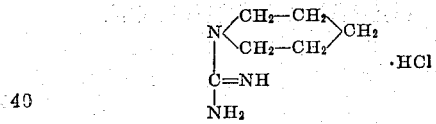

melts at 166°, the hydrobromide at about 122°, the picrate at 248°.

Example 14

To 12 grams of p-amino phenol are added 100 ccms of alcohol and a solution of 18 grams of S-ethyl isothiourea hydrobromide in 4 ccms of water. On being allowed to stand at about 40° for a longer time all the phenol dissolves and a great quantity of mercaptan forms. The guanidine phenol hydrobromide

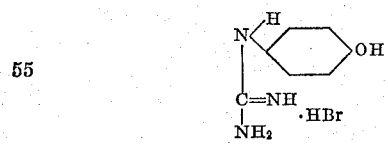

is a microcrystalline powder soluble in water. The picrate melts at 228°.

Example 15

The product obtained by reacting with 22 grams of 4-amino-1-phenyl-2.3-dimethyl-5-pyrazolon on 18 grams of S-ethyl isothiourea hydrobromide is readily soluble in water. It has the formula

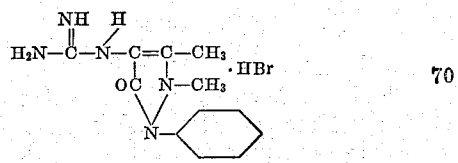

Example 16

6.4 parts of phenyl hydrazine react vigorously with 11 parts of S-ethyl isothiourea hydrobromide under formation of phenyl amino guanidine hydrobromide

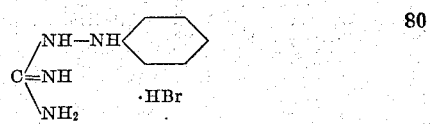

which crystallizes at once and melts at 196°. The picrate dissolves in water only with difficulty and melts at 199°.

Example 17

21 grams of pyrrolidine and 54.6 grams of S-ethyl isothiourea hydrobromide react under formation of guanyl pyrrolidine hydrobromide

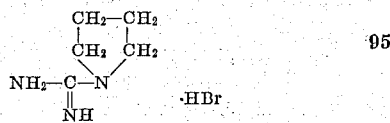

Its picrate dissolves only with difficulty in water and melts at 211°. The salts of the hydrochloride, bromide and iodide are readily soluble in water.

Example 18

30 grams of 1.3-di-p-nitrobenzoyl-2-ethyl isothiourea are stirred with about the same quantity of diethyl amine. Even before all solids have dissolved a heavy crystalline powder separates out. The mother liquor which contains mercaptan is removed and the residue which represents alpha-beta-di-p-nitrobenzoyl-gamma-diethyl guanidine

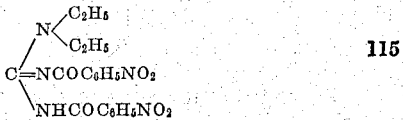

is almost pure enough to be analysed. It is scarcely soluble in water, only with difficulty in alcohol and acetone, readily dissolves in hot acetic ester and melts at 181°.

Example 19

250 grams of 1.3-dicarbethoxy-2-ethyl isothiourea are allowed to stand some time at ordinary temperature with about an equal quantity of benzyl amine. The mercaptan and the excess of amine are removed by distillation in vacuo and the residue forms alphabeta-di-carbethoxy-gamma-benzyl-guanidine

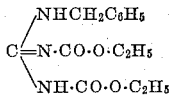

which is a syrup tending to solidify forming featherlike needles melting at 35°, being scarcely soluble in water but on the whole readily soluble in organic solvents.

*Example 20*

30 grams 1.3 dibenzoyl-2-ethyl isothiourea, if caused to react as above described, with methyl amino ethanol form the creatinol dibenzoate (alpha-beta-di-benzoyl gamma-methyl-hydroxy ethyl guanidine)

which is insoluble in water and petroleum ether and dissolves only with difficulty in alcohol.

*Example 21*

The same compound is obtained if methyl amino ethanol is allowed to act on 1.3-di benzoyl-2-methyl isothiourea. Here is formed the methyl mercaptan. The yield is 100%.

All the above temperatures are given in degrees centigrade.

Various changes may be made in the details of the operation and particularly in the proportions of the ingredients present in the solutions used without departing from the invention or sacrificing the advantages thereof.

In the appended claims the terms S-alkyl isothiourea and amine are meant to cover also the derivatives.

We claim:—

1. As a new product the alcohol of creatin having the formula

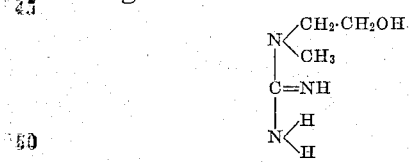

the compound being a deliquescent radiated mass which readily dissolves in methyl, ethyl or isopropyl alcohol, with difficulty in amyl alcohol and scarcely in acetic ester and acetone.

2. As a new product a substituted guanidine having the formula:

wherein R is a hydrogen atom, univalent hydrocarbon radical or an acyl group and the two R's may be the same or different, while X is a hydroxylated or alkoxylated alkyl group and Y a hydrogen atom or an alkyl group or X and Y form together a carbocyclic system, these products being bases capable of forming salts with acids and being decomposed by concentrated alkali.

3. As a new product a guanidine alcohol corresponding to the formula

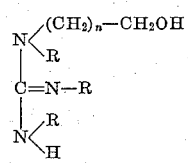

wherein R is a hydrogen atom, univalent hydrocarbon radical, or an acyl group and the three R's may be the same or different, while $n$ is a whole number, these products being bases capable of forming salts with acids and being decomposed by concentrated alkali.

4. The method of producing substituted guanidine comprising causing an S-alkyl isothiourea to act on a non-gaseous monoamine having at least one hydrogen atom attached to the nitrogen atom.

5. The method of producing substituted guanidine comprising causing an S-alkyl isothiourea to act in the presence of a solvent on a non-gaseous monoamine having at least one hydrogen atom attached to the nitrogen atom.

In testimony whereof we affix our signatures.

WALTER SCHOELLER.
HERBERT SCHOTTE.